United States Patent
Kadi et al.

(10) Patent No.: US 10,532,939 B2
(45) Date of Patent: Jan. 14, 2020

(54) COMPOSITE, A METHOD OF MAKING THEREOF, AND A METHOD FOR DEGRADING A POLLUTANT

(71) Applicant: King Abdulaziz University, Jeddah (SA)

(72) Inventors: Mohammad W. Kadi, Jeddah (SA); Reda Mohamedy Mohamed Ouf, Jeddah (SA)

(73) Assignee: King Abdulaziz University, Jeddah (SA)

( * ) Notice: Subject to any disclaimer, the term of this patent is extended or adjusted under 35 U.S.C. 154(b) by 134 days.

(21) Appl. No.: 15/491,643

(22) Filed: Apr. 19, 2017

(65) Prior Publication Data

US 2018/0305231 A1    Oct. 25, 2018

(51) Int. Cl.
| | | |
|---|---|---|
| *C02F 1/72* | (2006.01) | |
| *B01J 35/00* | (2006.01) | |
| *B01J 37/04* | (2006.01) | |
| *B01J 27/25* | (2006.01) | |
| *B01J 35/10* | (2006.01) | |
| *C02F 1/30* | (2006.01) | |
| *B01J 37/08* | (2006.01) | |
| *C02F 101/30* | (2006.01) | |
| *C02F 101/38* | (2006.01) | |

(52) U.S. Cl.
CPC ............. *C02F 1/725* (2013.01); *B01J 27/25* (2013.01); *B01J 35/004* (2013.01); *B01J 35/0013* (2013.01); *B01J 35/1014* (2013.01); *B01J 37/04* (2013.01); *C02F 1/30* (2013.01); *B01J 37/08* (2013.01); *C02F 2101/306* (2013.01); *C02F 2101/38* (2013.01); *C02F 2305/10* (2013.01)

(58) Field of Classification Search
None
See application file for complete search history.

(56) References Cited

U.S. PATENT DOCUMENTS

2011/0088739 A1    4/2011    Zinn et al.
2012/0267321 A1    10/2012    Kisailus et al.

FOREIGN PATENT DOCUMENTS

CN    104525238 A  *  4/2015
JP    2004255355 A  *  9/2004

OTHER PUBLICATIONS

Machine Translation of CN 104525238 (Espacenet)—Kudo et al (Year: 2015).*
Machine Translation of JP 2004255355 (Espacenet)—Leqiang et al (Year: 2004).*
Peng, Wen-chao et al—Synthesis of MoS2/g-C3N4 as a solar light-responsive photocatalyst for organic degradation—Catalysis Communications, Feb. 13, 2014 (Year: 2014).*
Zheng, Dandan et al—Layering MoS2on soft hollow g-C3N4 nanostructures for photocatalytic hydrogen evolution—Applied Catalysis A, Oct. 28, 2015 (Year: 2015).*
Wang, L., et al., "Metal/Graphitic Carbon Nitride Composites: Synthesis, Structures, and Applications", Chemistry An Asian Journal, vol. 11, pp. 3305-3328, (2016).
Wang, W., et al., "Advances in Photocatalytic Disinfection of Bacteria: Development of Photocatalysts and Mechanisms", Journal of Environmental Sciences, vol. 34, pp. 232-247, (2015).
Zhao, Z., et al., "Graphitic Carbon Nitride Based Nanocomposites: A Review", NANOSCALE, vol. 7, pp. 15-37, (2015).
Ong, W., et al., "Graphitic Carbon Nitride (gC3N4)-Based Photocatalysts for Artificial Photosynthesis and Environmental Remediation: Are We a Step Closer to Achieving Sustainability?", Chemical Reviews, vol. 116, No. 12, 2 Pages total, (2016) (Abstract only).

* cited by examiner

*Primary Examiner* — Bradley R Spies
(74) *Attorney, Agent, or Firm* — Oblon, McClelland, Maier & Neustadt, L.L.P.

(57) ABSTRACT

A composite containing carbon nitride and a mixed metal sulfide. The composite is useful as a photocatalyst. A method of making the composite and a method of photocatalyzing the degradation of pollutants are described herein.

19 Claims, 14 Drawing Sheets

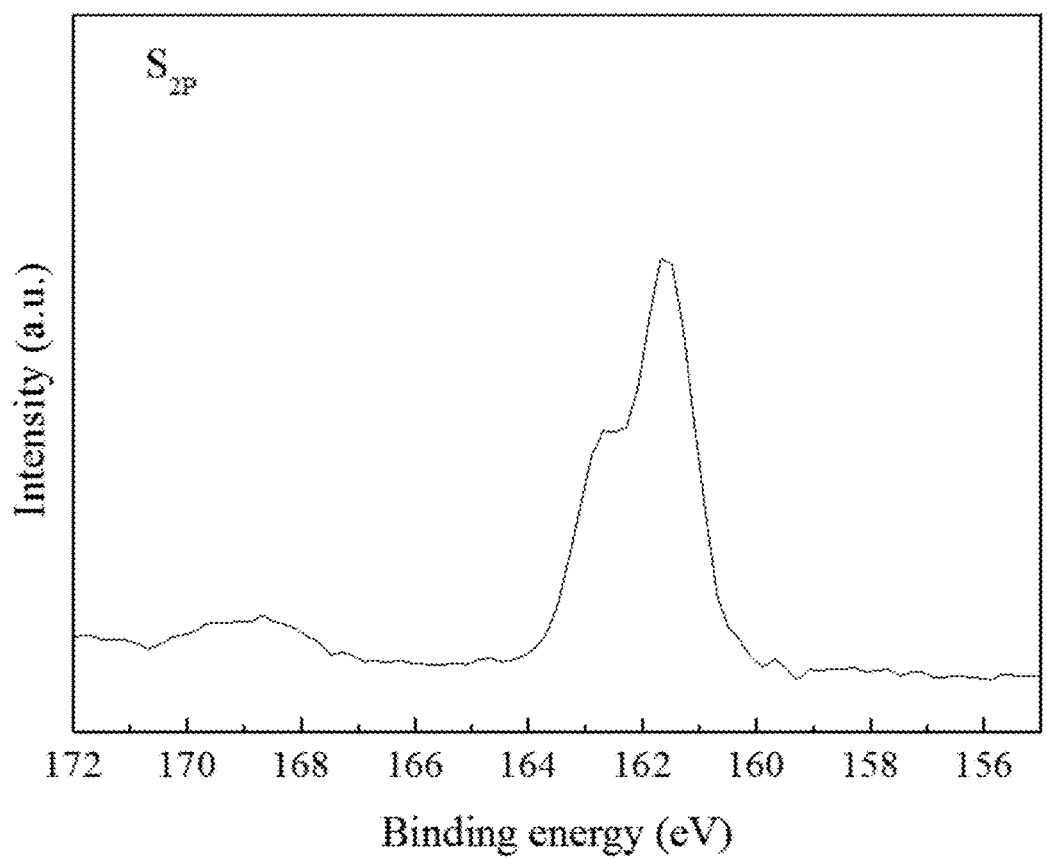

COMPOSITE, A METHOD OF MAKING THEREOF, AND A METHOD FOR DEGRADING A POLLUTANT

BACKGROUND

Technical Field

The present disclosure relates to a composite, a method of preparing the composite, and its use as a photocatalyst.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Graphitic carbon nitride (g-$C_3N_4$) has a sheet-like structure similar to that of graphite. This type of $C_3N_4$ structure has attracted researchers' attention in the field of photocatalysis because of its favorable properties which include narrow bad gap, non-metallic structure, physical and chemical stability, and bio-compatibility (Res Chem Intermed (2016) 42:3979-3998, incorporated herein by reference in its entirety). However the high recombination rate of the electron-hole pair and the poor visible light harvesting hinders its efficiency as a photocatalyst (Journal of Colloid and Interface Science 465 (2016) 83-92, incorporated herein by reference in its entirety). Researchers have tried to prepare g-$C_3N_4$ then decorate or dope it with an element or a group with the aim to reduce the recombination rate of the electron-hole pair and enhance visible light harvesting. Examples are abundant in the literature, for instance $TiO_2$ has been used to improve the properties of g-$C_3N_4$(International Journal of Hydrogen Energy 41 (2016) 5617-5628; Applied Catalysis B: Environmental 158-159 (2014) 20-29; Res Chem Intermed (2016) 42:3609-3624; and Front. Mater. Sci. 2016, 10(3): 310-319, each incorporated herein by reference in their entirety). Metals and combination of metals such as Zn and its compounds, Fe, W, Sn, Ni, Cr have been added to g-$C_3N_4$ to improve its photocatalytic efficiency (Applied Catalysis B: Environmental 200 (2017) 601-610; Catal Lett (2016) 146:2185-2192; J Mater Sci: Mater Electron (2016) 27:7311-7317; Journal of Molecular Catalysis A: Chemical 423 (2016) 463-471; J Mater Sci: Mater Electron (2016) 27:3791-3798; Journal of Hazardous Materials 260 (2013) 475-482; Journal of $CO_2$ Utilization 6 (2014) 17-25; J Mater Sci (2014) 49:6067-6073; Res Chem Intermed (2016) 42:6483-6499; and Journal of Wuhan University of Technology-Mater. Sci. Ed. December 2014, each incorporated herein by reference in their entirety). Silver has been added to g-$C_3N_4$ not only to improve the properties but also to add a new dimension in the applications of the compound represented in an antibacterial activity (Nano Research 2015, 8(5): 1648-1658; Ceramics International 41(2015)1197-1204; J Mater Sci (2015) 50:1718-1727; and Rare Metals, Vol. 30, Spec. Issue, March 2011, p. 276, each incorporated herein by reference in their entirety). Non-metals such as graphene oxide and others were also added to g-$C_3N_4$(Russian Journal of Physical Chemistry A, 2014, Vol. 88, No. 10, pp. 1643-1649, 2014, incorporated herein by reference in its entirety). These materials have not however provided sufficient photocatalytic performance with regard to, for example, photocatalytic degradation of pollutants Therefore, an objective of this disclosure is to provide a composite for photocatalysis, a method of making thereof, and a method of photocatalytic degradation of pollutants.

BRIEF SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

A first aspect of the disclosure relates to a composite, comprising carbon nitride and a mixed metal sulfide comprising sulfur and two or more metals selected from the group consisting of an alkali metal, an alkaline earth metal, a lanthanide, a transition metal, and a post-transition metal.

In one embodiment, the composite comprises up to 0.5-40 wt % of the mixed metal sulfide, based on a total weight of the composite.

In one embodiment, the composite comprises up to 0.5-20 wt % of the mixed metal sulfide.

In one embodiment, the carbon nitride is alpha carbon nitride, beta carbon nitride, graphitic carbon nitride, or a mixture thereof.

In one embodiment, the carbon nitride is graphitic carbon nitride.

In one embodiment, the graphitic carbon nitride is in a form of a sheet.

In one embodiment, the two or more metals are selected from the group consisting of a transition metal and a post-transition metal.

In one embodiment, the two or more metals are silver and gallium.

In one embodiment, the mixed metal sulfide is in a form of a particle.

In one embodiment, the mixed metal sulfide particle has an average diameter in a range of 0.5-5 nm.

In one embodiment, the carbon nitride is in the form of a sheet and the mixed metal sulfide particle is disposed on a surface of the sheet.

In one embodiment, the composite has a band gap energy in a range of more than 2 eV and less than 2.6 eV.

A second aspect of the disclosure relates to a method for producing the composite of the first aspect, comprising: (i) dissolving a surfactant in water thereby forming a first solution; (ii) mixing the first solution with an optionally substituted urea thereby forming a second solution; (iii) dissolving a first metal salt, a second metal salt, and a mercaptocarboxylic acid in water thereby forming a third solution; (iv) mixing the third solution with the second solution thereby forming a mixture; and (v) heating the mixture at a temperature in a range of 150-250° C. for a duration in a range of 5-20 hours thereby forming the composite.

In one embodiment, the surfactant is hexadecyltrimethyl ammonium bromide, the first metal salt is gallium nitrate, the second metal salt is silver nitrate, and the mercaptocarboxylic acid is mercaptoacetic acid.

A third aspect of the disclosure relates to a method for degrading a pollutant, comprising: (i) contacting the composite of the first aspect with a solution comprising water and 10-10,000 ppm of the pollutant thereby forming a mixture; and (ii) irradiating the mixture with a light of a wavelength in a range of 350-740 nm thereby degrading the pollutant.

In one embodiment, an amount of the composite in the mixture is in a range of 0.4-2 g/L.

In one embodiment, at least 50% of the pollutant is degraded within 50 minutes of the irradiating.

In one embodiment, the pollutant is a herbicide, a pesticide, or both.

In one embodiment, the herbicide comprises a triazine structure.

In one embodiment, the method further comprises: (i) recovering the composite after the pollutant is degraded; and (ii) recycling the recovered composite, which maintains photocatalytic activity after being recycled for at least 4 reaction cycles.

DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2C is a XPS spectrum indicating the presence of sulfide, $S^{2-}$, in an embodiment of the composite.

DETAILED DESCRIPTION OF THE EMBODIMENTS

Figure 1:
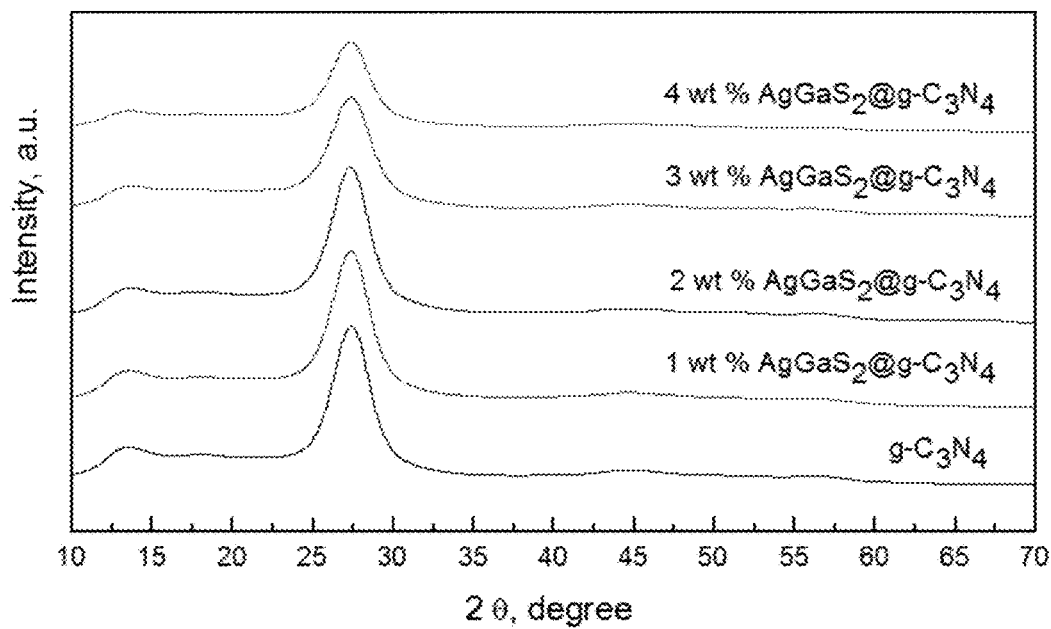
FIG. 1 is an overlay of the X-ray diffraction (XRD) patterns of graphitic carbon nitride and embodiments of the composite.

Embodiments of the present disclosure will now be described more fully hereinafter with reference to the accompanying drawings, in which some, but not all of the embodiments of the disclosure are shown.

The present disclosure will be better understood with reference to the following definitions.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, a "composite" refers to a solid material comprising more than one phase and/or compound. The composite may be a micro-composite or a nanocomposite.

As used herein, a "nanocomposite" refers to a composite wherein the phase and/or compound domains have one or more dimensions of 100 nm or less, and/or repeat distances of 100 nm or less.

The first aspect of the disclosure relates to a composite comprising, consisting essentially of, or consisting of carbon nitride and a mixed metal sulfide. The mixed metal sulfide comprises sulfur and two or more metals. Each metal is independently an alkali metal (e.g., lithium, sodium, potassium, rubidium, cesium, and francium), an alkaline earth metal (e.g., beryllium, magnesium, calcium, strontium, barium, and radium), a lanthanide (e.g., lanthanum, cerium, praseodymium, neodymium, promethium, samarium, europium, gadolinium, terbium, dysprosium, holmium, erbium, thulium, ytterbium, and lutetium), an actinide (actinium, thorium, protactinium, uranium, *neptunium*, plutonium, americium, curium, berkelium, californium, einsteinium, fermium, mendelevium, nobelium, and lawrencium), a transition metal (scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum, gold, rutherfordium, dubnium, seaborgium, bohrium, hassium, meitnerium, darmstadtium, roentgenium, and copernicium), and a post-transition metal (e.g., aluminum, indium, gallium, tin, bismuth, lead, thallium, zinc, cadmium, and mercury). For a mixed metal sulfide of formula $M_xM'_yS_z$, where M is the first metal ion, M' is the second metal ion, x:y may be in a range of 10:1 to 1:10, 5:1 to 1:5, or 2:1 to 1:2. In some embodiments, x:y is 1:1. A ratio x:z may be in a range of 10:1 to 1:10, 5:1 to 1:5, or 2:1 to 1:2. A ratio y:z may be in a range of 10:1 to 1:10, 5:1 to 1:5, or 2:1 to 1:2. Preferably, the ratio x:z and y:z are 1:2. Exemplary mixed metal sulfides include, without limitation, silver gallium sulfide, copper zinc tin sulfide, copper indium gallium sulfide, copper indium sulfide, aluminum cerium sulfide, bismuth cobalt zinc sulfide, cobalt aluminum sulfide, copper aluminum sulfide, copper iron sulfide, copper zinc iron sulfide, iron nickel sulfide, manganese(II) titanium sulfide, nickel chromium sulfide, nickel cobalt sulfide, nickel zinc iron sulfide, titanium silicon sulfide, ytterbium iron sulfide, and cadmium zinc sulfide. The sulfur may be present in a form of a sulfide, $S^{2-}$, a disulfide, $S_2^{2-}$, or a mixture of both. The oxidation state of the sulfur may be determined by photoelectron spectroscopy (e.g., X-ray photoelectron spectroscopy and ultraviolet photoelectron spectroscopy).

The composite may be substantially free of metal oxide and mixed metal oxide. For example, the composite may contain not more than 0.1 wt %, not more than 0.05 wt %, or not more than 0.01 wt % of metal oxide and/or mixed metal oxide as these oxides may have a wide bandgap and thus may hinder the performance of the composite, for example, in water purification. The composite may have a band gap energy more than 1 eV, more than 1.1 eV, more than 1.2 eV, more than 1.5 eV, more than 2 eV, more than 2.1 eV, or more than 2.2 eV, and less than 2.6 eV, less than 2.5 eV, less than 2.4 eV, or less than 2.3 eV. The composite may have a band gap energy which is 0.1-1 eV, 0.2-0.8 eV, or 0.3-0.5 eV less than the band gap energy of the carbon nitride alone.

The composite may comprise up to 1 wt %, up to 5 wt %, up to 10 wt %, up to 20 wt %, up to 30 wt %, up to 40 wt %, up to 50 wt % of the mixed metal sulfide, based on a total weight of the composite. In some embodiments, the composite comprises 0.5-40 wt %, 0.5-25 wt %, 0.5-20 wt %, 1-10 wt %, or 2.5-6 wt % of the mixed metal sulfide, based on a total weight of the composite. The mixed metal sulfide may be in a form of a particle. The mixed metal sulfide particle may be spherical or substantially spherical (e.g., oval or oblong shape). In other embodiments, the mixed metal sulfide particle can be of any shape that provides desired photocatalytic activity. In some embodiments, the mixed metal sulfide particle is in the form of at least one shape such as a sphere, a rod, a cylinder, a rectangle, a triangle, a pentagon, a hexagon, a prism, a disk, a platelet, a flake, a cube, a cuboid, and an urchin (e.g., a globular particle possessing a spiky uneven surface).

The mixed metal sulfide particles may be uniform. As used herein, the term "uniform" refers to no more than 10%, no more than 5%, no more than 4%, no more than 3%, no more than 2%, or no more than 1% of the distribution of the mixed metal sulfide particles having a different shape. For example, the mixed metal spheres are uniform and have no more than 1% of mixed metal sulfide particles in an oblong shape. In some embodiments, the mixed metal sulfide particles may be non-uniform. As used herein, the term "non-uniform" refers to more than 10% of the distribution of the mixed metal sulfide particles having a different shape.

Dispersity is a measure of the heterogeneity of sizes of molecules or particles in a mixture. In probability theory and statistics, the coefficient of variation (CV), also known as relative standard deviation (RSD) is a standardized measure of dispersion of a probability distribution. It is expressed as a percentage and is defined as the ratio of the standard deviation ($\sigma$) of to the mean ($\mu$, or its absolute value $|\mu|$). The CV or RSD is widely used to express precision and repeatability. It shows the extent of variability in relation to the mean of a population. The mixed metal sulfide particles having a narrow size dispersion, i.e. monodispersity, is preferred. As used herein, "monodisperse", "monodispersed" and/or "monodispersity" refers to mixed metal sulfide particles having a CV or RSD of less than 25%, preferably less than 20%.

The mixed metal sulfide particles may be monodisperse with a coefficient of variation or relative standard deviation (ratio of the particle size standard deviation to the particle size mean) of less than 15%, less than 12%, less than 10%, less than 9%, less than 8%, less than 7%, less than 6%, less than 5%, or preferably less than 2%.

In one embodiment, the mixed metal sulfide particles are monodisperse and have a particle diameter distribution in a range of 75% of the average particle diameter to 125% of the average particle diameter, 80-120%, 85-115%, 86-114%, 87-113%, 88-112%, 89-111%, 90-110%, or preferably 95-105% of the average particle diameter.

An average diameter of the particle, as used herein, refers to the average linear distance measured from one point on the particle through the center of the particle to a point directly across from it. The mixed metal sulfide particles may have an average diameter in a range of 0.5-5 nm, 0.5-4 nm, 0.5-3 nm, 0.5-2 nm, or 0.5-1 nm. In some embodiments, the mixed metal sulfide particles have an average diameter in a range of 0.01-500 µm, 0.05-400 µm, 0.1-300 µm, 0.5-200 µm, 1-150 µm, 10-120 µm, 30-90 µm, or 50-70 µm. The mixed metal sulfide particles may be agglomerated or, preferably, non-agglomerated (i.e. the mixed metal sulfide particles are well separated from one another and do not form clusters). In one embodiment, the mixed metal sulfide particles are agglomerated and the agglomerates have an average diameter in a range of 2-20 nm, 4-15 nm, or 5-10 nm. The mixed metal sulfide particles may be crystalline, polycrystalline, nanocrystalline, or amorphous.

The carbon nitride may contain one or more of $C_{11}N_4$, $C_2N$, $CN$, $C_3N_4$, $CN_2$, $CN_6$, or mixtures thereof. The carbon nitride may be amorphous, crystalline, polycrystalline, or mixtures thereof. Preferably, the carbon nitride is nanocrystalline with a crystallite size in a range of 1-20 nm, 5-15 nm, 7-12 nm, or preferably 9-11 nm.

The carbon nitride may be alpha carbon nitride, beta carbon nitride, graphitic carbon nitride, or a mixture thereof. The carbon nitride may be in a form of a particle in a shape of a sphere, an ellipsoid, a rod, a cylinder, a rectangle, a triangle, a pentagon, a hexagon, a prism, a disk, a platelet, a flake, a cube, a cuboid, or an urchin. In some embodiments, the carbon nitride particle is irregularly-shaped. The average diameter of the carbon nitride particle may be at least 100 nm, at least 500 nm, or at least 1,000 nm, and up to 10,000 nm, up to 5,000 nm, or up to 2,000 nm.

In some embodiments, the carbon nitride is in a form of a sheet with a structure similar to a graphene sheet (i.e., a two-dimensional atomic layer with a hexagonal lattice in which each atom forms a vertex). The carbon nitride sheet may be in a shape of a circle, an oval, a square, a rectangle, a triangle, a pentagon, a hexagon, or a rhombus. In some embodiments, the carbon nitride sheet is irregularly-shaped. An average length (or a diameter) of the carbon nitride sheet may be longer than 20 nm, longer than 50 nm, longer than 100 nm, or longer than 500 nm, and up to 1 mm, up to 0.5 mm, or up to 0.1 mm. An average breadth of the carbon nitride sheet may be at least 20 nm, at least 50 nm, at least 100 nm, or at least 500 nm, and shorter than 1 mm, shorter than 0.5 mm, or shorter than 0.1 mm. An average thickness of the carbon nitride sheet may be in a range of 0.3-100 nm, 1-90 nm, 10-70 nm, 30-60 nm, or 40-50 nm.

The sheets of carbon nitride may be arranged in a substantially planar manner relative to each other so as to form a layered structure with 1-300 layers, preferably 10-100 layers, more preferably 20-80 layers. As used herein, the term "substantially planar" refers to the vast majority of the sheets are generally located within the same average plane or within substantially parallel planes. For example, at least 60%, preferably at least 80%/c, more preferably at least 90% of the carbon nitride sheets may be aligned along a major axis at no more than 10°, preferably no more than 7°, more preferably no more than 5°, relative to adjacent sheets. An average interlayer distance may vary from 0.1-10 nm, preferably 0.5-5 nm, more preferably 0.5-2 nm. The term "substantially planar" does not mean that the carbon nitride sheets per se are flat because at a molecular level, the sheets may have a corrugated or undulating configuration.

Figure 10A:
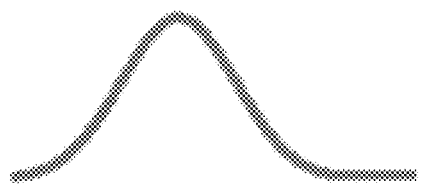
FIG. 10A shows the shape of the ridges on an embodiment of a carbon nitride sheet.
Figure 10B:
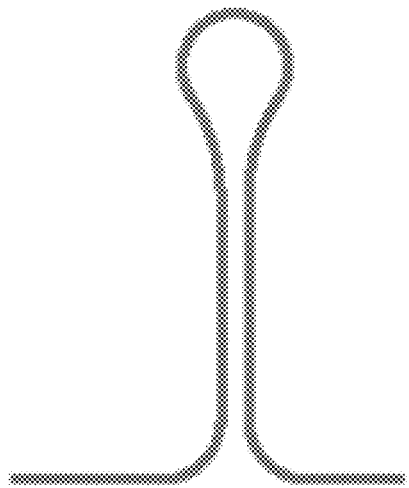
FIG. 10B shows the collapsed shape of the ridges on another embodiment of the carbon nitride sheet.
Figure 10C:
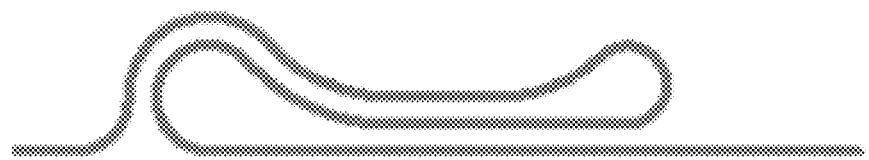
FIG. 10C shows the folded shape of the ridges on another embodiment of the carbon nitride sheet.

A surface of the carbon nitride may comprise ridges. The ridges may cover up to 10% of the surface of carbon nitride, preferably up to 30%, more preferably up to 60%. The ridges may be arranged in a substantially parallel manner relative to each other. As used herein, the term "substantially parallel" refers to the vast majority of the ridges are separated by substantially the same distance. For example, at least 60%, preferably at least 80%, more preferably at least 90% of the ridges may be aligned at no more than 10°, preferably no more than 7°, more preferably no more than 5°, relative to adjacent ridges. In some embodiments, the ridges have a shape shown in FIG. 10A. In other embodiments, the ridges have a collapsed shape shown in FIG. 10B. In an embodiment, the ridges have a folded shape shown in FIG. 10C. An average width of the ridges may range from less than 1 nm to 200 nm, preferably 5-150 nm, preferably 10-100 nm, more preferably about 25-75 nm. Additionally, an average height of the ridges (i.e., the average distance from the base of the ridges to the top of the ridges) may range from 0.5-10 nm, preferably 0.9-8 nm, more preferably 2-6 nm. An average length of a ridge may range from 0.5-40 nm, preferably 1-30 nm, more preferably 5-25 nm. An average distance between successive ridges may range from 0.1-10 nm, preferably 0.1-5 nm, more preferably 0.5-2 nm.

The carbon nitride may be mesoporous or microporous. The term "microporous" means the carbon nitride has an average pore diameter of less than 2 nm. The term "mesoporous" means the carbon nitride has an average pore diameter of 2-50 nm. An average pore size of the carbon nitride may be in a range of 1-10 nm, 1-5 nm, 1-3 nm, preferably 1.5-2.5 nm. A porosity of the carbon nitride may be in a range of 0.5-95 vol %, 0.5-80 vol %, 0.5-70 vol %, 0.5-60 vol %, 0.5-50%, 5-50 vol %, 10-50 vol %, 10-40 vol %, 10-30 vol %, or preferably 10-20 vol %, based on a total volume of the carbon nitride.

The mixed metal sulfide particles may interact with the carbon nitride sheet/particle via van der Waals and/or electrostatic forces. The mixed metal sulfide particles may be located on the surface of the carbon nitride sheet/particle and/or embedded within the carbon nitride sheet/particle. In an embodiment where the mixed metal sulfide particles are well dispersed (i.e., not agglomerated), the mixed metal sulfide particles may be evenly dispersed (i.e., a distance between a metal sulfide particle and all its neighbors is the same or substantially the same) or randomly dispersed (i.e., the distance between a metal sulfide particle and all its neighbors are different). The distance can be said to be substantially the same when the shortest distance is at least 80%, at least 85%, at least 90%, or at least 95% of the average distance and the longest distance is not more than 120%, not more than 110%, or not more than 105% of the average distance. The distance is measured from a center of a mixed metal sulfide particle to a nearest mixed metal sulfide particle and may be in a range of 0.1-50 nm, 1-40 nm, 2-30 nm, or 5-20 nm.

A surface roughness of the composite may range from 0.01-10 nm, 0.01-5 nm, 0.01-1 nm, 0.01-0.4 nm, 0.05-0.4 nm, 0.05-0.3 nm, 0.05-0.2 nm, or 0.05-0.1 nm.

The composite may have a BET surface area in a range of 50-200 m²/g, 60-160 m²/g, 70-150 m²/g, 80-140 m²/g, 90-130 m²/g, 90-120 m²/g, or 90-110 m²/g.

The dimensions of the carbon nitride particle/sheet and mixed metal sulfide particle may vary from the described ranges and the composite can still function as intended.

The second aspect of the disclosure relates to a method for producing the composite described in the first aspect. The method comprises, consists essentially of, or consists of: (i) dissolving a surfactant in water thereby forming a first solution, (ii) mixing the first solution with an optionally substituted urea thereby forming a second solution, (iii) dissolving two or more metal salts and a mercaptocarboxylic acid in water thereby forming a third solution, (iv) mixing the third solution with the second solution thereby forming a mixture, and (v) heating the mixture at a temperature in a range of 150-250° C. for a duration in a range of 5-20 hours thereby forming the composite. The method may be conducted as a batch or continuous process. "Continuous", as used herein, refers to producing materials without interruption or where the reactants are flowed and/or are in motion during a chemical reaction.

The mixture may be heated at a temperature in a range of 150-250° C., 170-240° C., 190-230° C., or 195-205° C., for 5-20 hours, 5-15 hours, or preferably 8-12 hours. The mixture may be stirred (e.g., at a speed of 50-1,000 rpm, 50-900 rpm, 50-700 rpm, 50-500 rpm, 100-500 rpm, preferably 200-400 rpm) or left to stand while heated.

After the heating, the mixture may be left to cool to a temperature in a range of 10-40° C., 10-30° C., or preferably 20-30° C. The composite may be collected/washed/dried by methods known to those of ordinary skill in the art. For example, the composite particles may be collected by filtering the cooled mixture, washed with solvents, such as water and ethanol, and dried in an oven at a temperature in a range of 60-110° C., 70-105° C., or 95-105° C. at a pressure of 0.001-10 mbar, 0.001-5 mbar, 0.001-2 mbar, 0.001-1 mbar, or preferably 0.001-0.5 mbar for 5-20 hours, 5-15 hours, or preferably 7-13 hours. Alternatively, the composite particles may be dried in the oven at a pressure of 0.8-1.2 bar, 0.9-1.1 bar, or 0.95-1.05 bar.

An amount of the optionally substituted urea in the mixture may be in a range of 0.001-0.5 moles, 0.005-0.4 moles, 0.01-0.3 moles, 0.01-0.2 moles, 0.01-0.1 moles, preferably 0.01-0.05 moles. In some embodiments, a concentration of the optionally substituted urea in the mixture is in range of 0.001-10 M, 0.005-5 M, or 0.01-1 M. The optionally substituted urea may be represented by the following formula:

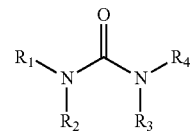

where $R_1$-$R_4$ are each independently a hydrogen, an optionally substituted alkyl group, an optionally substituted cycloalkyl group, an optionally substituted aryl group, or an optionally substituted arylalkyl group.

As used herein, the term "substituted" means at least one hydrogen atom is replaced with a non-hydrogen group, provided that normal valencies are maintained and that the substitution results in a stable compound.

The term "alkyl", as used herein, unless otherwise specified, refers to a straight or branched hydrocarbon fragment. Non-limiting examples of such hydrocarbon fragments include methyl, ethyl, propyl, isopropyl, butyl, isobutyl, t-butyl, pentyl, isopentyl, neopentyl, hexyl, isohexyl, 3-methylpentyl, 2,2-dimethylbutyl, and 2,3-dimethylbutyl.

As used herein, the term "cycloalkyl" refers to a cyclized alkyl group. Exemplary cycloalkyl groups include, but are not limited to, cyclopropyl, cyclobutyl, cyclopentyl, cyclohexyl, norbornyl, and adamantyl. Branched cycloalkyl groups, for example, 1-methylcyclopropyl and 2-methycyclopropyl groups, are included in the definition of cycloalkyl as used in the present disclosure.

The term "aryl", as used herein, and unless otherwise specified, refers to phenyl, biphenyl, naphthyl, anthracenyl, and the like.

The term "arylalkyl" as used in this disclosure refers to a straight or branched chain alkyl moiety having 1 to 8 carbon atoms that is substituted by an aryl group or a substituted aryl group having 6 to 12 carbon atoms, and includes benzyl, 2-phenethyl, 2-methylbenzyl, 3-methylbenzyl, 4-methylbenzyl, 2,4-dimethylbenzyl, 2-(4-ethylphenyl)ethyl, 3-(3-propylphenyl)propyl.

When a R group is noted as "optionally substituted", the substituents are selected from the exemplary group including, but not limited to, alkoxy (i.e. straight or branched chain alkoxy having 1 to 10 carbon atoms, and includes, for example, methoxy, ethoxy, propoxy, isopropoxy, butoxy, isobutoxy, sec-butoxy, lert-butoxy, pentoxy, isopentoxy, hexyloxy, heptyloxy, octyloxy, nonyloxy, and decyloxy); cycloalkyloxy including cyclopentyloxy, cyclohexyloxy, and cycloheptyloxy; aryloxy including phenoxy and phenoxy substituted with halogen, alkyl, and alkoxy; hydrocarbyl; arylalkyl; hydroxy; alkoxy; thiol; alkylthio; arylthio; arylalkylthio; alkylthiono; arylthiono; aryalkylthiono; alkylsulfonyl; arylsulfonyl; arylalkylsulfonyl; sulfonamido (e.g., —SO$_2$NH$_2$); substituted sulfonamide; nitro; carbamyl (e.g., —CONH$_2$, —CONHalkyl, —CONHaryl, —CONHarylalkyl or cases where there are two substituents on one nitrogen from alkyl, aryl, or arylalkyl); aryl; and mixtures thereof and the like. The substituents may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety.

The term "alkylthio" as used in this disclosure refers to a divalent sulfur with alkyl occupying one of the valencies and includes the groups methylthio, ethylthio, propylthio, butylthio, pentylthio, hexylthio, and octylthio.

The term "hydrocarbyl" as used herein refers to a univalent hydrocarbon group containing up to about 24 carbon atoms (i.e. a group containing only carbon and hydrogen atoms) and that is devoid of olefinic and acetylenic unsaturation, and includes alkyl, cycloalkyl, alkyl-substituted cycloalkyl, cycloalkyl-substituted cycloalkyl, cycloalkylalkyl, aryl, alkyl-substituted aryl, cycloalkyl-substituted aryl, arylalkyl, alkyl-substituted aralkyl, and cycloalkyl-substituted aralkyl.

The present disclosure is further intended to include all isotopes of atoms occurring in the present compounds. Isotopes include those atoms having the same atomic number but different mass numbers. By way of general example, and without limitation, isotopes of hydrogen include deuterium and tritium. Isotopes of carbon include $^{13}$C and $^{14}$C. Isotopically labeled compounds of the disclosure can generally be prepared by conventional techniques known to those skilled in the art or by processes and methods analogous to those described herein, using an appropriate isotopically labeled reagent in place of the non-labeled reagent otherwise employed.

Exemplary optionally substituted ureas include urea, (2-hydroxyethyl)urea, 1,3-bis(4-nitrophenyl)urea, N,N'-bis(hydroxymethyl)urea, N-[3-(trifluoromethyl)benzyl]urea, 1-(4-ethoxyphenyl)urea, 1-((2-methoxyphenyl)methyl)-3-(2-methylphenyl)urea, N-cyclohexyl-N'-[3-(1-hydroxyethyl)phenyl]urea, 1,1-dimethylurea, N,N'-dimethylurea, 3-(4-chlorophenyl)-1,1-dimethylurea, 3-cyclooctyl-1,1-dimethylurea, 3-(3,4-dichlorophenyl)-1,1-dimethylurea, 3-(4-isopropylphenyl)-1,1-dimethylurea, 3-(3-chloro-4-methyl)-1,1-dimethylurea, 3-(2,3-dichlorophenyl)-1,1-dimethylurea, 3-(2,4-dichlorophenyl)-1,1-dimethylurea, 3-(2,5-dichlorophenyl)-1,1-dimethylurea, 3-(2,5-dimethoxyphenyl)-1,1-dimethylurea, 3-(2,6-dichlorophenyl)-1,1-dimethylurea, 3-(2,6-diethylphenyl)-1,1-dimethylurea, 3-(2,6-diisopropylphenyl)-1,1-dimethylurea, 3-(3,5-dichlorophenyl)-1,1-dimethylurea, 3-(3-bromophenyl)-1,1-dimethylurea, and 3-cyclohexyl-1,1-dimethylurea.

Exemplary metal salts include halides (e.g., fluoride, chloride, bromide, and iodide), nitrates, acetylacetonates, acetates, perchlorates, sulfamates, trifluoroacetylacetonates, carbonates, and sulfates of the alkaline earth metal, the lanthanide, the actinide, the transition metal, and the post-transition metal. In most embodiments, the metal salt is a hydrate. In a preferred embodiment, there are two metal salts: a first metal salt is gallium nitrate and a second metal salt is silver nitrate. Additional metal salts can be added to provide a mixed metal sulfide with more than two types of metals. In some embodiments, a third metal salt, such as gold chloride, is added. In other embodiments, a third metal salt and a fourth metal salt are added.

Depending on the desired amount of the mixed metal sulfide in the composite, an amount of the first metal salt may be up to 50 mol %, up to 40 mol %, up to 30 mol %, or up to mol %, based on the number of moles of the optionally substituted urea. In some embodiments, the amount of the first metal salt is up to 9 mol %, up to 8 mol %, up to 7 mol %, up to 6 mol %, up to 5 mol %, up to 4 mol %, or preferably up to 3 mol %. In some embodiments, the amount of the first metal salt is in a range of 0.0001-1 mol %, 0.005-0.5 mol %, or 0.001-0.1 mol %. The concentration of the first metal salt in the mixture may be in a range of 0.01 mM to 5 M, 0.1 mM to 2 M, or 0.2 mM to 1 M.

An amount of the second metal salt added to the mixture depends on the chemical formula of the sulfide, $M_xM'_yS_z$, and the ratio x:y. An amount of the second metal salt may be up to 10-fold, up to 5-fold, up to 2-fold or about the same as the number of moles of the first metal salt. In some embodiments, the concentration of the second metal salt in the mixture may be in a range of 0.01 mM to 5 M, 0.1 mM to 2 M, or 0.2 mM to 1 M. In most embodiments, the amount of the first metal salt, second metal salt, and mercaptocarboxylic acid are added in stoichiometric amounts (i.e. there is no excess of either reagent). In some embodiments, the concentration of the mercaptocarboxylic acid in the mixture may be in a range of 0.02 mM to 10 M, 0.2 mM to 4 M, or 0.4 mM to 2 M.

Exemplary mercaptocarboxylic acid include, without limitation, mercaptoacetic acid (also known as thioglycolic acid), 3-mercaptopropionic acid, 2-mercaptopropionic acid, 2-mercaptobutyric acid, 3-mercaptobutyric acid, 4-mercaptobutyric acid, 2-mercaptohexanoic acid, 3-mercaptohexanoic acid, 4-mercaptohexanoic acid, 5-mercaptohexanoic acid, 6-mercaptohexanoic acid, 2-mercaptooctanoic acid, 3-mercaptooctanoic acid, 4-mercaptooctanoic acid, 5-mercaptooctanoic acid, 6-mercaptooctanoic acid, 7-mercaptooctanoic acid, 8-mercaptooctanoic acid, 12-mercaptododecanoic acid, 16-mercaptohexadecanoic acid, 2-mercaptosuccinic acid, and meso-2,3-dimercaptosuccinic acid.

Tap water, distilled water, doubly distilled water, deionized water, deionized distilled water, or combinations thereof may be used in the synthesis of the composite. In one embodiment, the water at 20-30° C. may have a conductivity of less than 10 $\mu S \cdot cm^{-1}$, less than 5 $\mu S \cdot cm^{-1}$, or less than 1 $\mu S \cdot cm^{1}$; and/or a resistivity greater than 0.1 $M\Omega \cdot cm$, greater than 1 $M\Omega \cdot cm$, greater than 5 $M\Omega \cdot cm$, or greater than 10 $M\Omega \cdot cm$; and/or a total solid concentration less than 5 mg/kg, less than 1 mg/kg, or less than 0.5 mg/kg; and/or a total organic carbon concentration less than 1000 µg/L, less than 200 µg/L, or less than 50 µg/L.

An amount of the surfactant may be in a range of 0.005-0.1 moles, 0.01-0.05 moles, or 0.011-0.02 moles. A concentration of the surfactant in the first solution may be in a range of 0.1-5 M, 0.5-3 M, or 0.6-1 M. The surfactant may be a cationic surfactant (based on a quaternary ammonium cation), an anionic surfactant (based on sulfate, sulfonate, or carboxylate anions), a zwitterionic (amphoteric) surfactant, or a non-ionic surfactant. Preferably, cationic surfactants such as quaternary ammonium salts are used. Exemplary quaternary ammonium salts include hexadecyltrimethyl ammonium bromide (also known as cetrimonium bromide), cetrimonium chloride, cetylpyridinium chloride, benzalkonium chloride, benzethonium chloride, dimethyldioctadecylammonium chloride, dimethyldioctadecylammonium bromide, methyltrialkyl($C_8$-$C_{10}$)ammonium chloride (e.g., Adogen® 464), octenidine dihydrochloride, behentrimonium chloride, bronidox, lauryl methyl gluceth-10 hydroxypropyl dimonium chloride, olaflur, n-oleyl-1,3-propanediamine, stearalkonium chloride, tetramethylammonium hydroxide, thonzonium bromide, and dioctadecyldimethylammonium bromide.

Exemplary anionic surfactants include sulfonates (e.g., docusate (dioctyl sodium sulfosuccinate), perfluorooctanesulfonate, perfluorobutanesulfonate, sodium nonanoyloxybenzenesulfonate, and sodium dodecylbenzenesulfonate), phosphonates (e.g., alkyl-aryl ether phosphates, alkyl ether phosphates), sulfates (ammonium lauryl sulfate, potassium lauryl sulfate, magnesium laureth sulfate, sodium pareth sulfate, sodium myreth sulfate, sodium laureth sulfate, sodium dodecyl sulfate), and carboxylates (ammonium perfluorononanoate, sodium laurate, sodium lauroyl sarcosinate).

Exemplary zwitterionic surfactants include (amido)betaines (cocamidopropyl betaine and lauryl betaine), amine oxides (lauryldimethylamine oxide, myristamine oxide), 3-[(3-cholamidopropyl)dimethylammonio]-1-propanesulfonate, 3-[(3-cholamidopropyl)dimethylammonio]-2-hydroxy-1-propanesulfonate, cocamidopropyl hydroxysultaine, hydroxysultaine, dipalmitoylphosphatidylcholine, and sodium lauroamphoacetate.

Exemplary non-ionic surfactants include alkyl polyglycoside, Cetomacrogol 1000, cetostearyl alcohol, cetyl alcohol, cocamide DEA, cocamide MEA, decyl glucoside, decyl polyglucose, disodium cocoamphodiacetate, glycerol monostearate, IGEPAL CA-630, Isoceteth-20, lauryl glucoside, maltosides, monolaurin, mycosubtilin, Nonidet P-40, nonoxynols (e.g., nonoxynol-9), NP-40, octaethylene glycol monododecyl ether, N-octyl beta-D-thioglucopyranoside, octyl glucoside, oleyl alcohol, PEG-10 sunflower glycerides, pentaethylene glycol monododecyl ether, polidocanol, poloxamer, poloxamer 407, polyethoxylated tallow amine, polyglycerol polyricinoleate, polysorbates (e.g., Polysorbate 20, Polysorbate 80), sorbitan, sorbitan monolaurate, sorbitan monostearate, sorbitan tristearate, stearyl alcohol, surfactin, Triton X-100, and Tween 80.

The surfactant may be adsorbed onto the surface of the composite and/or in the pores. The surfactant may interact with the surface of the composite and/or the pores via van der Waals forces or electrostatic forces (for cationic, anionic, zwitterionic surfactants).

The third aspect of the disclosure relates to a method for degrading pollutants. The method comprises, consists essentially of, or consists of: (i) contacting the composite of the first aspect with a solution comprising water and 10-10,000 ppm of the pollutant thereby forming a mixture; and (ii) irradiating the mixture with a light of a wavelength in a range of 350-740 nm, or 350-420 nm, thereby degrading the pollutant. As used herein, the term "degrading" refers to breaking down the pollutant into atoms, ions, and/or smaller molecules (e.g., nitrogen gas, carbon dioxide, and water). For example, degradation of the pollutant can include breaking existing chemical bonds in the pollutant so as to change the physical and/or chemical properties of the pollutant.

An amount of the composite particles in the mixture is in a range of 0.1-5 g/L, 0.1-4 g/L, 0.1-3 g/L, 0.1-2.5 g/L, or preferably 0.4-2 g/L. In one embodiment, the composite particles are dispersed within the mixture, and may further be filtered and recycled after the pollutant is degraded (e.g., at least 50%, at least 60%, at least 70%, at least 80%, at least 90% of the pollutant has broken down). In one embodiment, the composite particles are placed in a bag (preferably transparent) and the bag is immersed in the reaction mixture. Accordingly, the composite particles remain in the bag until the degradation is completed. A material that permits at least 50%, 75%, 80%, 90%, or 95% of light of any portion of the light spectrum to pass through the bag may be considered transparent.

The solution comprises water which may be tap water, distilled water, doubly distilled water, deionized water, deionized distilled water, reverse osmosis water, or combinations thereof. In one embodiment the water is doubly distilled to eliminate trace metals.

The method may be conducted as a batch or continuous process. The mixture may be irradiated with a light source such as a xenon lamp, a mercurial lamp, a metal halide lamp, a LED lamp, a LED chip, a solar simulator, and a halogen lamp. Two or more light sources may be used. Sunlight may also be used as the light source. The irradiation source may be fitted with a filter to block or attenuate light with wavelengths longer than 400 nm. In some embodiments, the irradiation source is a flame, a lantern, a gas discharge lamp, an incandescent bulb, a laser, a fluorescent lamp, an electric arc, a cathode ray tube. Preferably the irradiation source may have a total power output of 50-1,000 W, preferably 100-750 W, more preferably 250-600 W, and may be positioned 5-30 cm, preferably 7-20 cm, more preferably 8-15 cm from the closest surface of the mixture. The mixture may be irradiated for at least 1 minute, at least 10 minutes, or at least 20 minutes, and not more than 600 minutes, not more than 300 minutes, or not more than 100 minutes.

The mixture may be shaken/stirred throughout the duration of the degradation by employing a rotary shaker, a magnetic stirrer, or an overhead stirrer. In another embodiment, the mixture is left to stand (i.e. not stirred). In one embodiment, the mixture is sonicated. The method may be performed at a temperature in a range of 10-60° C., 10-50° C., 10-40° C., 10-30° C., or preferably 20-30° C. The mixture may be temperature-regulated to prevent overheating and/or evaporation, for example, by a water tubing, a water and/or ice bath, ice packs, or air cooling. The method may be performed at a pressure in a range of 0.5-2 atm, 0.5-1.7 atm, 0.5-1.5 atm, 0.7-1.5 atm, or preferably 0.9-1.2 atm.

The composite particles may be used to photodegrade organic pollutants such as pesticides (e.g., aldrin, chlordane, DDT, dieldrin, endrin, heptachlor, hexachlorobenzene, mirex, toxaphene), herbicides (e.g., glyphosate, 2-methyl-4-chlorophenoxyacetic acid, 2,4-dichlorophenoxyacetic acid, 2,4,5-trichlorophenoxyacetic acid), industrial chemicals (e.g., hexachlorobenzene, polychlorinated biphenyls (PCBs), methyl tertiary butyl ether), and by-products (e.g., hexachlorobenzene, polychlorinated dibenzo-p-dioxins, polychlorinated dibenzofurans). In some embodiments, the herbicide comprises a triazine structure. The triazines have a planar six-membered benzene-like ring but with three carbons replaced by nitrogens. The three isomers of triazine are distinguished by the positions of their nitrogen atoms, and are referred to as 1,2,3-triazine, 1,2,4-triazine, and 1,3,5-triazine (s-triazine). Exemplary herbicides with a triazine structure include, without limitation, chlorinated s-triazines (e.g., atrazine, cyanazine, cyprozine, simazine, procyazine, and propazine), methoxy s-triazines (e.g., atraton, prometon, secbumeton, and simeton), and methylthio s-triazines (e.g., ametryn, prometryn, terbutryn, simetryn, and desmetryne).

The reduction in the concentration of the pollutant may be measured by high-pressure liquid chromatography (HPLC). Gas(es) (e.g., carbon dioxide) may be formed when the pollutant is degraded. Accordingly, the degradation of the pollutant may be followed by measuring the volume of the gas(es) evolved. The production of gas(es) may be measured by methods known to those of ordinary skill in the art such as gas chromatogram, a gas syringe, and displacement of water. At least 10%, at least 20%, at least 30%, at least 40%, at least 50%, at least 60%, at least 70%, at least 80%, or at least 90% by weight of the pollutant has broken down within 5 minutes, within 10 minutes, 20 minutes, within 30 minutes, within 40 minutes, within 50 minutes, or within 60 minutes of irradiating the mixture with the light.

In some embodiments, the organic pollutant may contain nitrogen and/or halogen atoms in the structure and may form ions, such as nitrate and halides (e.g., fluoride, chloride, bromide, and iodide), upon degradation. As such, the degradation of the organic pollutant may be followed by measuring the concentration of the ions with ion chromatography.

The degradation rate of the pollutant may be at least 0.01 g of pollutant/h per gram of composite, at least 0.02 g/h per gram, at least 0.05 g/h per gram, at least 0.1 g/h per gram, or at least 0.2 g/h per gram, and up to 10 g/h per gram, up to 8 g/h per gram, up to 5 g/h per gram, or up to 2 g/h per gram. The rate of degrading the pollutant by the composite may be 2-times faster, 2-7 times faster, or 2-5 times faster than the rate of degrading the pollutant by carbon nitride alone.

In some embodiments, the method further comprises: (i) recovering the composite particles after the pollutant is degraded, and (ii) recycling the recovered composite particles, which maintains photocatalytic activity after being recycled for at least 4 reaction cycles. The composite particles may be separated by removing the bag of composite particles, dialysis in a solvent, or using a micro-filter or a paper filter. The phrase "recycling the composite particles" refers to a process whereby the composite particles are first washed by an organic solvent, dried, and then added to a new solution containing the pollutant for a subsequent run. Preferred organic solvents for washing the composite particles and/or dialysis may include, without limitation, methanol, acetone, ethanol, tetrahydrofuran, acetonitrile, dichloromethane, ether, glycol ether, acetamide, dimethyl acetamide, dimethyl sulfoxide, or combinations thereof. The composite particles may be dried in vacuum and optionally heated, for example, the catalyst may be dried in a vacuum oven. Dried composite particles may be stored in a desiccator until the next run.

In one embodiment, the composite particles are recycled for at least 4 runs, preferably at least 10 runs, more preferably at least 20 runs, even more preferably at least 30 runs. The degradation of the pollutant may decrease less than 20%, preferably less than 10%, less than 5%, less than 4%, less than 3%, less than 2%, or more preferably less than 1% after the composite particles are used for at least 4 runs, preferably at least 10 runs, more preferably at least 20 runs, even more preferably at least 30 runs.

Having generally described this disclosure, a further understanding can be obtained by reference to the examples which are provided herein for purposes of illustration only and are not intended to be limiting unless otherwise specified.

Example 1 Synthesis of the Composites

Two mixtures (A and B) were prepared. Mixture A was prepared as follows: 5 g of hexadecyltrimethyl ammonium bromide (HTAB) was dissolved in 20 mL of distilled water under magnetic stirring; and 0.6 g of urea was added dropwise to HTAB solution. Mixture B was prepared as follows: gallium nitrate, mercaptoacetic acid, and silver nitrate were dissolved in 50 mL of doubly distilled water with stirring.

To prepare composites of various wt % of $AgGaS_2$ namely 1, 2, 3, and 4, stoichiometric amounts of these materials were added each time to prepare the four solutions. The mole ratio 1:1:2 of silver:gallium:sulfur was chosen as the starting composition for the preparations.

Mixture A was added dropwise to mixture B and the resulting mixture was transferred to a Teflon-lined stainless steel autoclave and heated for 10 h at 200° C. The nanocomposite was separated from the mixture, washed many times, and dried in an oven at 100° C. for 12 h.

For the preparation of graphitic carbon nitride (g-$C_3N_4$), mixture A was transferred to the Teflon-lined stainless steel autoclave and heated for 10 h at 200° C. The graphitic carbon nitride was separated, washed many times, and dried in an oven at 100° C. for 12 h.

Example 2 Characterization of the Composites

The crystalline phase of the nanocomposite was determined by powder X-ray diffraction (XRD) using Bruker axis D8 with Cu Kα radiation ($\lambda$=1.540 Å) at room temperature. The XRD patterns of g-$C_3N_4$ and the composites are shown in FIG. 1 which shows that g-$C_3N_4$ and the composites are composed of single phase of g-$C_3N_4$. No peaks for $AgGaS_2$ were observed because the $AgGaS_2$ particles were dispersed on the surface of g-$C_3N_4$. The amount of $AgGaS_2$ could be below the detection limit of XRD spectrometer. The characteristic peak of g-$C_3N_4$ at 27.40 was broadened by the addition of $AgGaS_2$. The peak broadening increased with increasing amounts of $AgGaS_2$, indicating that the crystallite size of g-$C_3N_4$ decreased as the weight percent of $AgGaS_2$ increased.

Figure 2A:
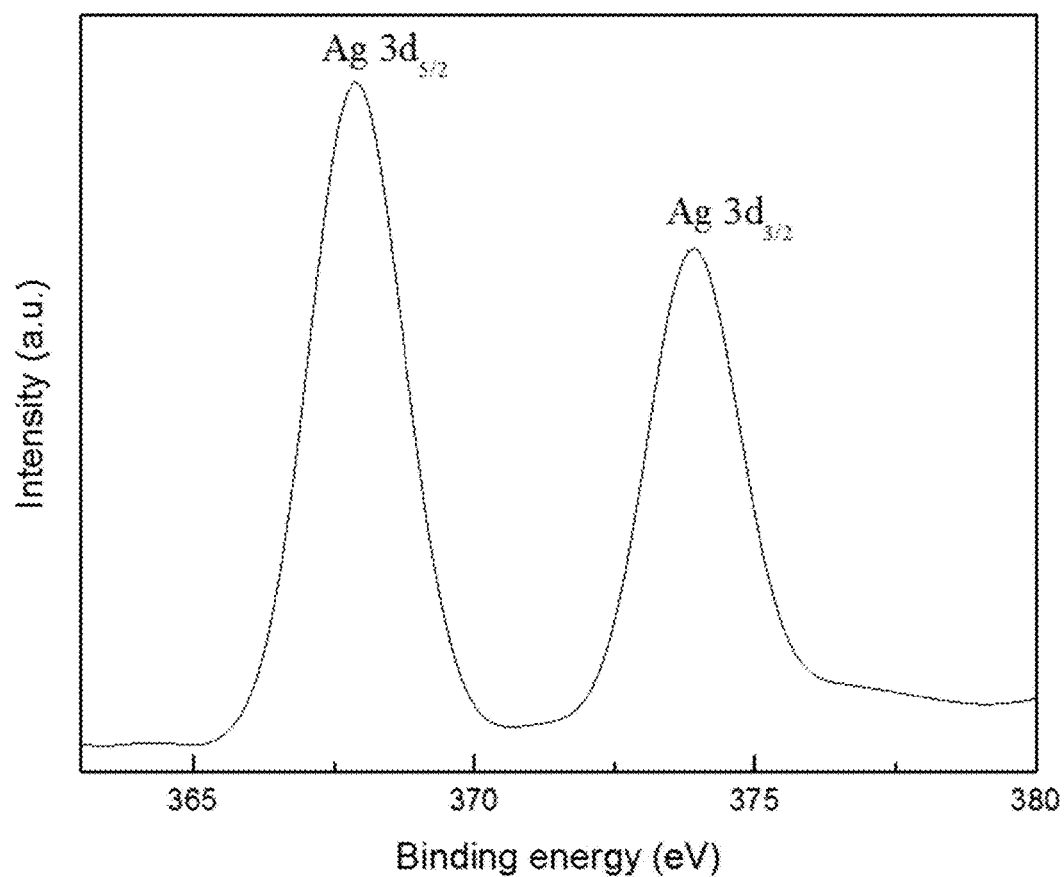
FIG. 2A is a X-ray photoelectron spectroscopy (XPS) spectrum indicating the presence of Ag(I) in an embodiment of the composite.
Figure 2B:
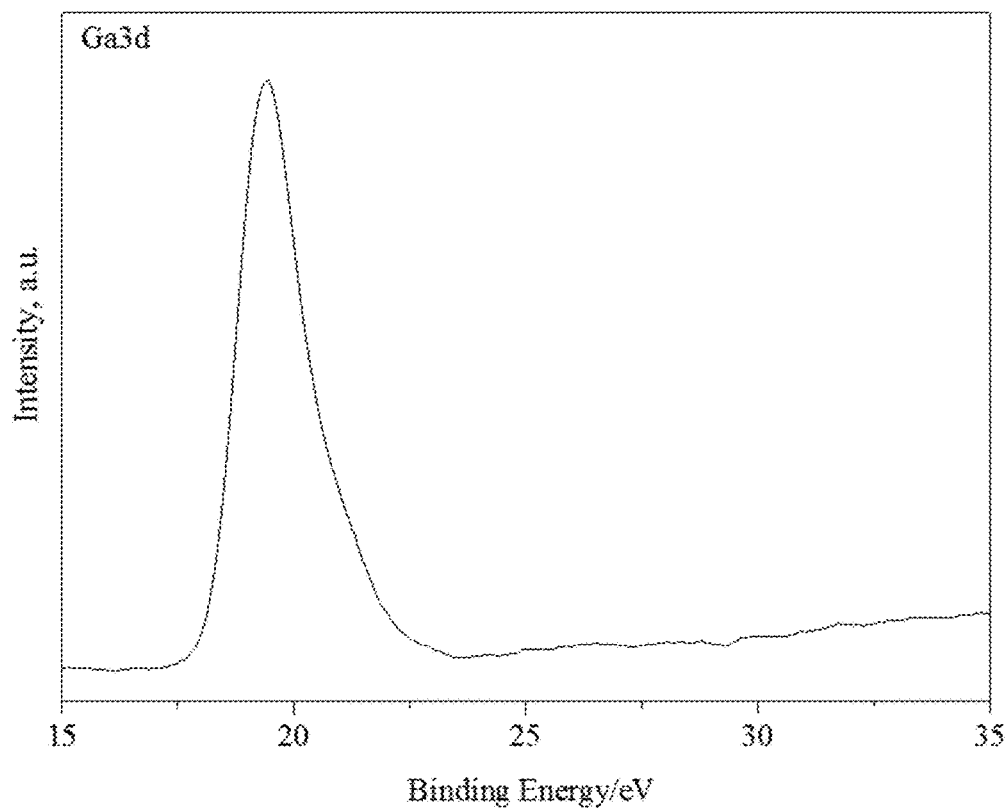
FIG. 2B is a XPS spectrum indicating the presence of Ga(III) in an embodiment of the composite.
Figure 2D:
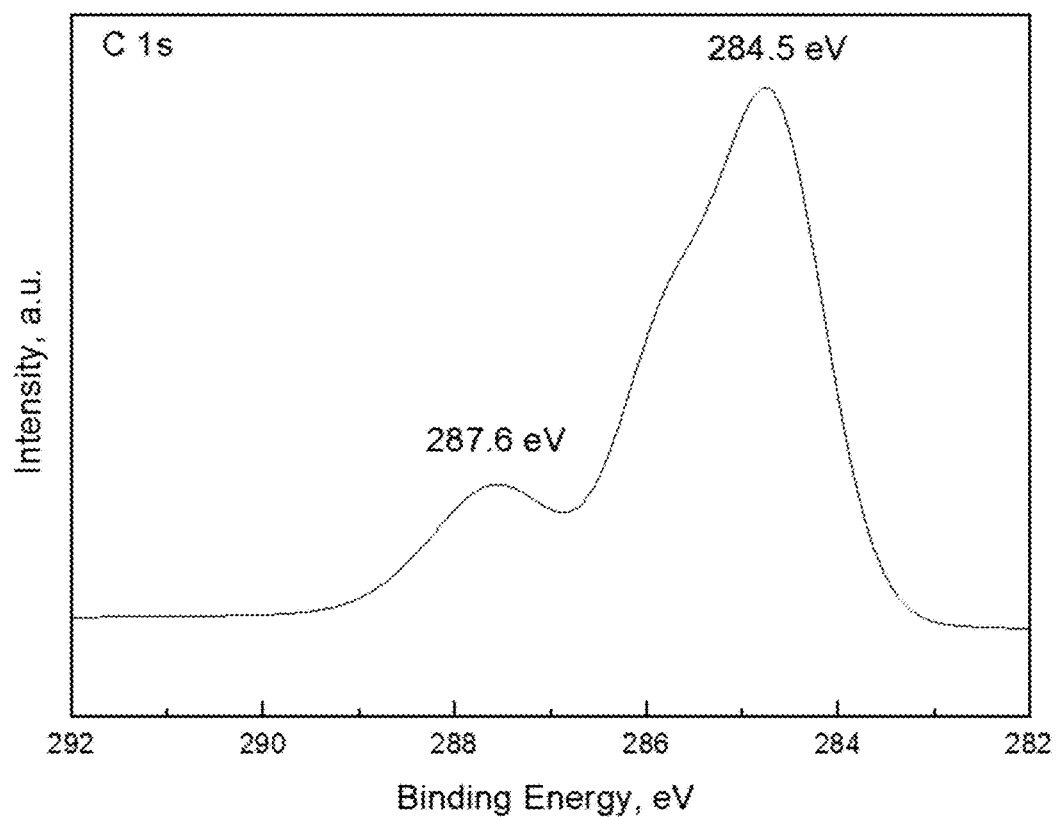
FIG. 2D is a XPS spectrum indicating the presence of carbon in an embodiment of the composite.
Figure 2E:
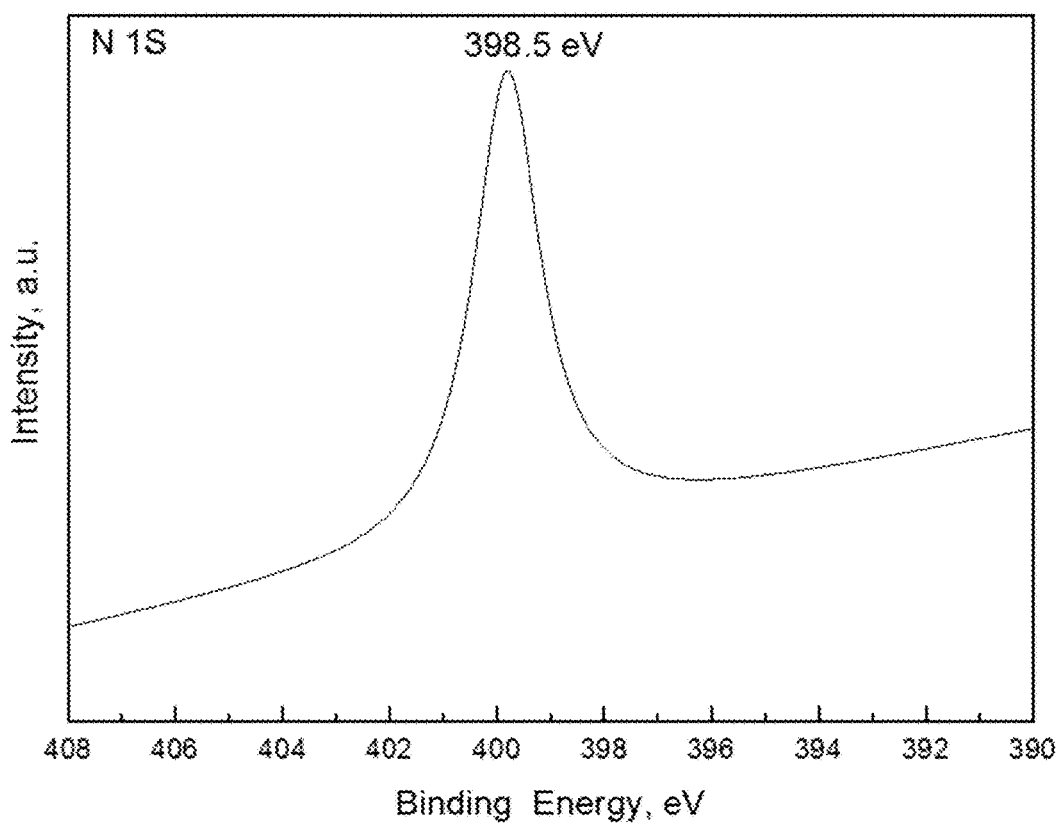
FIG. 2E is a XPS spectrum indicating the presence of nitrogen in an embodiment of the composite.

X-ray photoelectron spectroscopy (XPS) measurements were performed on a Thermo Scientific K-ALPHA spectrometer. The XPS spectra for Ag3d, Ga3d, S 2p, C1s and N1s of a nanocomposite with 3 wt % of $AgGaS_2$ are shown in FIGS. 2A-2E. FIG. 2A shows two peaks of Ag3d at binding energies 373.9 eV and 367.8 eV, thus confirming the presence of Ag(I). FIG. 2B shows a peak of Ga3d at binding energy 19.4 eV, thus confirming the presence of Ga(III). FIG. 2C shows a broad peak of S2p at binding energy 162 eV, thus confirming the presence of $S^{2-}$. FIG. 2D shows two peaks of C1s at binding energies 287.6 eV and 284.5 eV, thus confirming the presence of carbon as C=N. FIG. 2E shows a peak of N1s at binding energy 398.5 eV, thus confirming the presence of nitrogen as C=N—C($sp^2$ hybridized nitrogen). These observations confirmed that the nanocomposite contains graphitic carbon nitride and silver gallium sulfide.

Figures 3A, 3B:
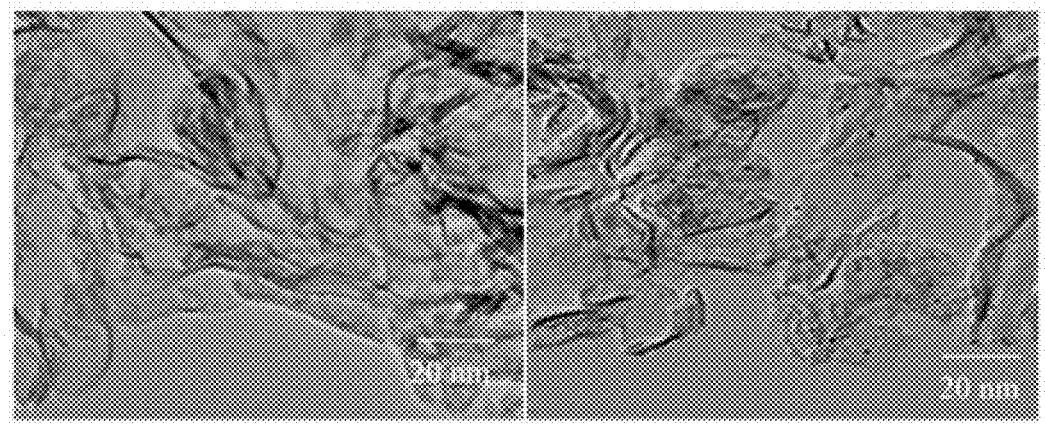
FIG. 3A is a transmission electron micrograph of graphitic carbon nitride.
FIG. 3B is a transmission electron micrograph of an embodiment of the composite containing 1 wt % silver gallium sulfide.
Figures 3C, 3D:
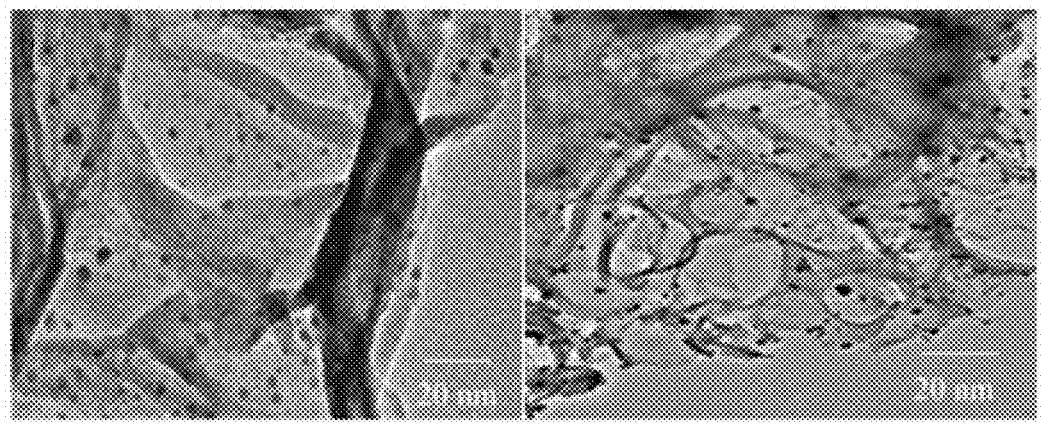
FIG. 3C is a transmission electron micrograph of an embodiment of the composite containing 2 wt % silver gallium sulfide.
FIG. 3D is a transmission electron micrograph of an embodiment of the composite containing 3 wt % silver gallium sulfide.
Figure 3E:
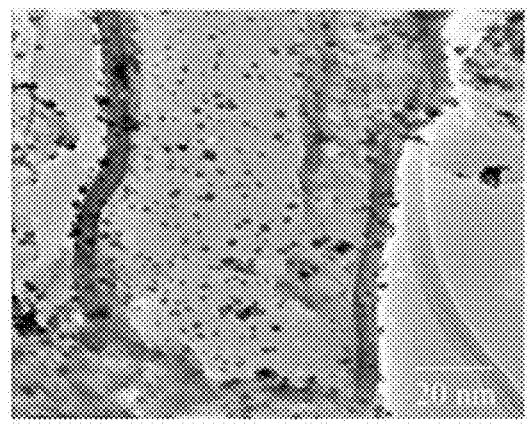
FIG. 3E is a transmission electron micrograph of an embodiment of the composite containing 4 wt % silver gallium sulfide.

The morphology and dimensions of the nanocomposite were observed with a JEOL-JEM-1230 transmission electron microscopy (TEM). Samples were suspended in ethanol and ultrasonicated for 30 minutes. A small amount of the sample was then dried on a carbon coated copper grid and loaded into the TEM. The transmission electron micrographs of $g-C_3N_4$ and $AgGaS_2@g-C_3N_4$ nanocomposite samples are shown in FIGS. 3A-3E. FIGS. 3B-3D show the $AgGaS_2$ particles are dispersed on the surface of $g-C_3N_4$ when the amount of $AgGaS_2$ was from 1 to 3 wt %. FIG. 3E shows that some of the $AgGaS_2$ particles form agglomerates when the amount of $AgGaS_2$ increased above 3 wt %.

Nitrogen gas-adsorption measurements were taken with samples, which were heated for 2 h under vacuum at 100° C., with a Nova 2000 series Chromatech apparatus at 77K to calculate surface area. The BET surface area of $g-C_3N_4$ and the composites are shown in Table 1. The results show that the surface area of the composites is similar to that of $g-C_3N_4$. Therefore, BET surface area is not an important factor for the enrichment of the photocatalytic activity of graphitic carbon nitride.

TABLE 1

BET surface area of $g-C_3N_4$ and $AgGaS_2@g-C_3N_4$ samples.

| Samples | Surface area (m²/g) |
|---|---|
| $g-C_3N_4$ | 100 |
| 1 wt % $AgGaS_2@g-C_3N_4$ | 99.9 |
| 2 wt % $AgGaS_2@g-C_3N_4$ | 99.8 |
| 3 wt % $AgGaS_2@g-C_3N_4$ | 99.7 |
| 4 wt % $AgGaS_2@g-C_3N_4$ | 99.6 |

Figure 4:
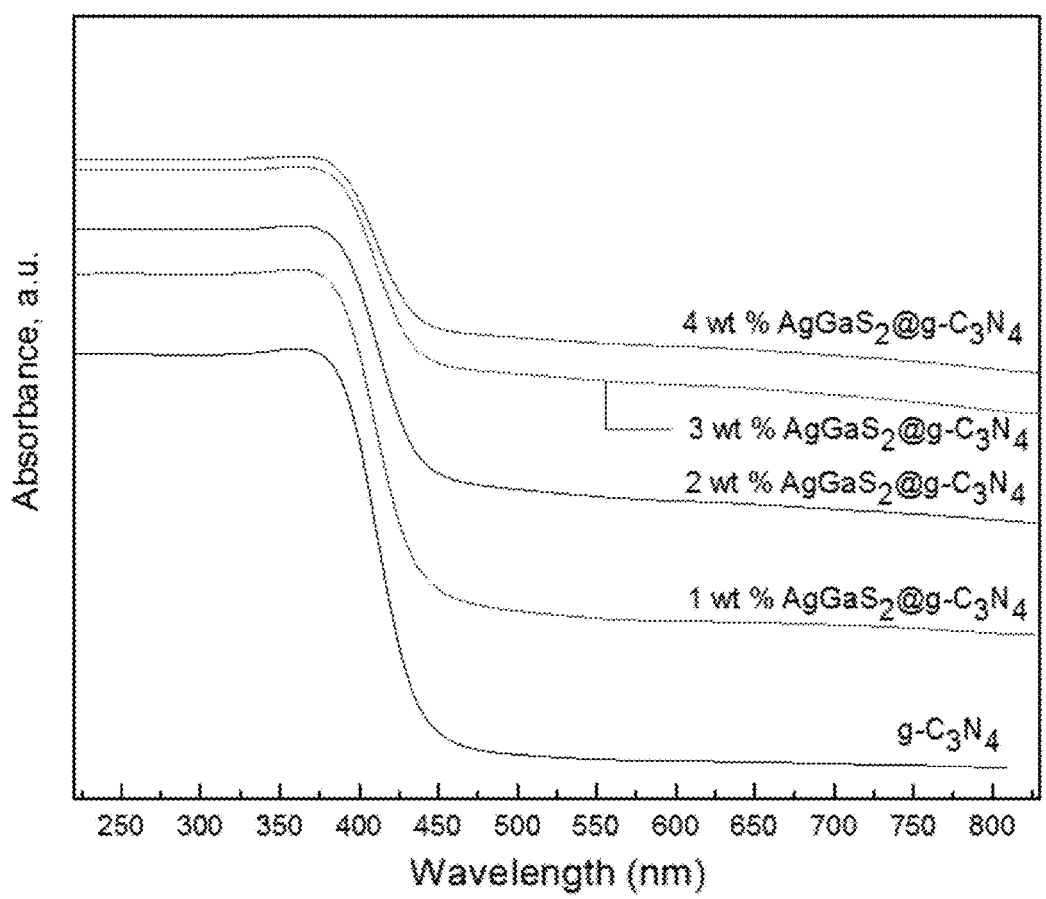
FIG. 4 is an overlay of the UV-Vis absorption spectra of graphitic carbon nitride and embodiments of the composite.

The band gaps of $g-C_3N_4$ and the composites were determined from the ultra violet-visible diffuse reflectance spectra (UV-Vis-DRS), which were taken with a UV-Vis-NIR spectrophotometer (V-570, Jasco, Japan) in air at room temperature to detect absorption over the range of 200 to 800 nm. FIG. 4 shows the UV-Vis spectra of $g-C_3N_4$ and $AgGaS_2@g-C_3N_4$ nanocomposites samples. The absorption edge of $g-C_3N_4$ was shifted to a longer wavelength as the weight percent of $AgGaS_2$ was increased from 0 to 4 wt %. The band gap energies calculated from the UV-Vis spectra are 2.6, 2.5, 2.4, 2.2, and 2.15 eV, for $g-C_3N_4$, 1 wt % $AgGaS_2@g-C_3N_4$, 2 wt % $AgGaS_2@g-C_3N_4$, 3 wt % $AgGaS_2@g-C_3N_4$, and 4 wt % $AgGaS_2@g-C_3N_4$, respectively.

Figure 5:
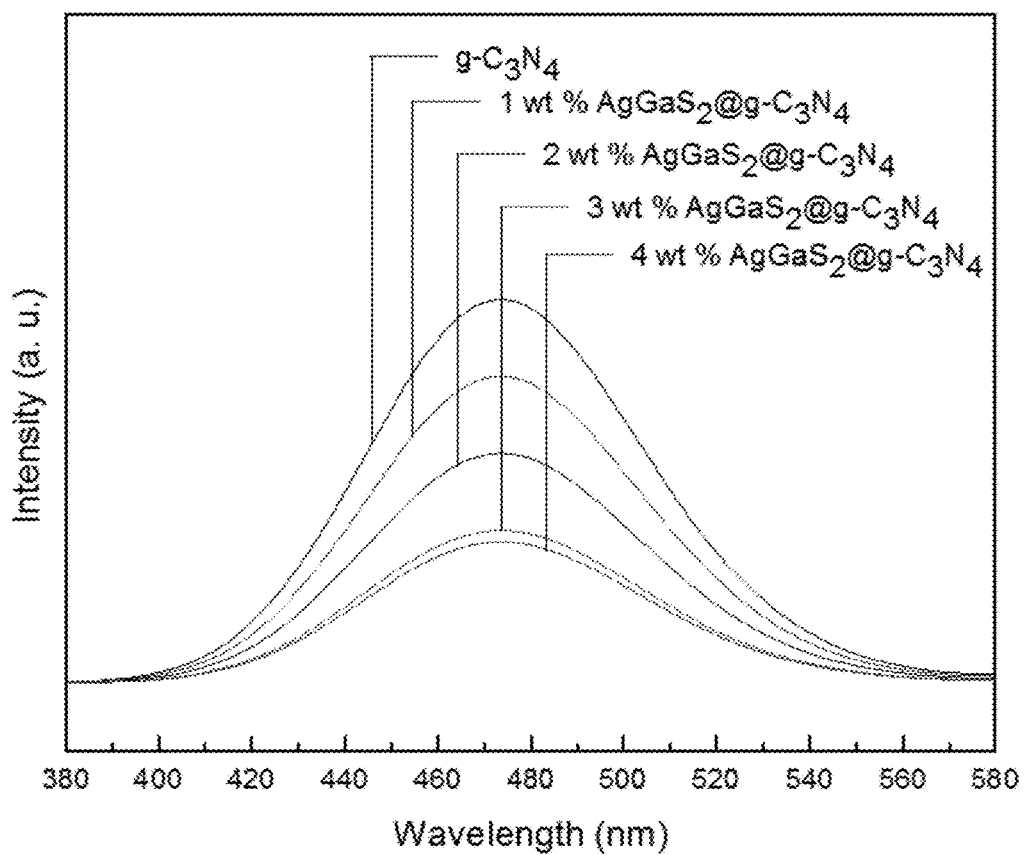
FIG. 5 is an overlay of the photoluminescence emission spectra of graphitic carbon nitride and embodiments of the composite.

Photoluminescence emission spectra (PL) of $g-C_3N_4$ and the composites were obtained with a Shimadzu RF-5301 fluorescence spectrophotometer. The PL spectra of $g-C_3N_4$ and the composites are shown in FIG. 5. The PL peak intensity of $g-C_3N_4$ decreased as the amount of $AgGaS_2$ increased from 0 to 4 wt %. Thus, the presence of $AgGaS_2$ on the $g-C_3N_4$ surface prevented electron-hole recombination by trapping photogenerated electrons.

Example 3 Photocatalytic Degradation of Atrazine

The photocatalytic performance of the nanocomposite was performed under visible light irradiation and the photoxidation of atrazine was measured. A 300-W Xenon lamp was used as the irradiation source with an optical cut-off filter to remove any light with wavelength below 420 nm. An aqueous solution of 100 ppm atrazine was kept in the dark for 30 min prior to the illumination step to ensure that complete adsorption-desorption equilibrium was reached. The change in the concentration of atrazine was measured with high-pressure liquid chromatography (Shimadzu LC 20 A) with a C18 column UV detector. To confirm the complete oxidation of atrazine into carbon dioxide, chloride, and nitrate ions, the concentrations of chloride and nitrate ions were measured using ion chromatography (DX-300) with a CDM-II conductivity detector and an AS4A-SC column. To confirm the presence of carbon dioxide gas as one of the final products from the photocatalytic oxidation of atrazine, gases evolved from the photocatalytic reaction were passed over a 0.2 M NaOH solution. Then, a barium nitrate solution was added, and the resulting white precipitate was analyzed using XRD.

Figure 6:
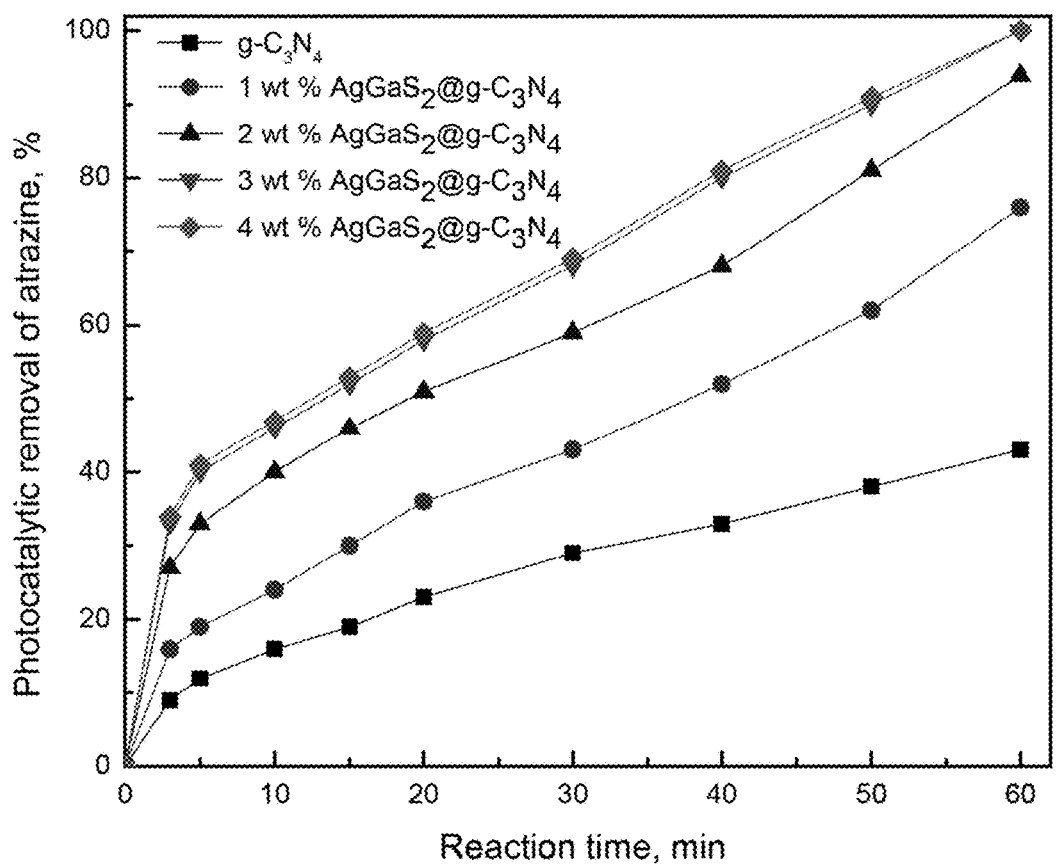
FIG. 6 is a graph showing the photocatalytic activity of graphitic carbon nitride and embodiments of the composite.

The effect of the amount of $AgGaS_2$ on the photocatalytic activity of the composites in degrading atrazine is shown in FIG. 6. The results reveal that increasing the amount of $AgGaS_2$ from 0 to 3 wt % increased the photocatalytic activity of $g-C_3N_4$ from 43 to 100%, respectively. Increasing the amount of $AgGaS_2$ above 3 wt % had no significant effect on the photocatalytic activity of the composite. Therefore, the amount of $AgGaS_2$ played an important role in controlling the band gap and the photocatalytic activity of the composite. The nanocomposite with 3 wt % $AgGaS_2$ had the highest photocatalytic activity.

Figure 7:
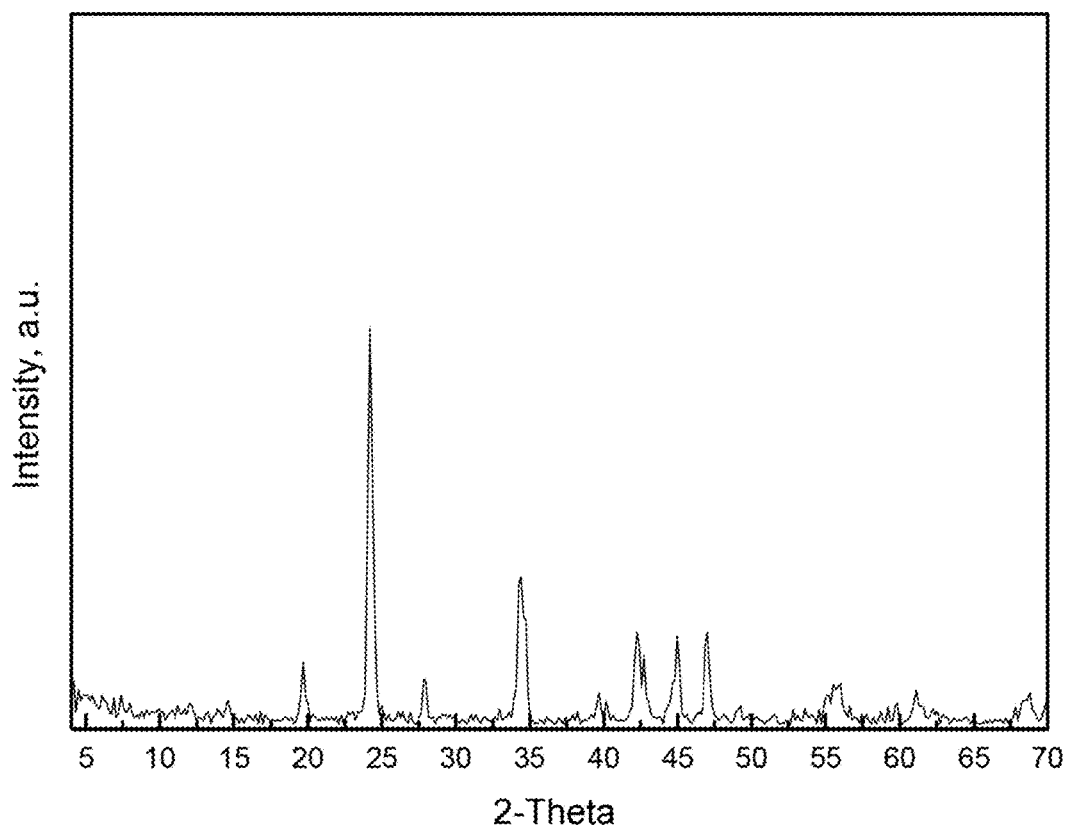
FIG. 7 is a XRD pattern of a white precipitate formed after the addition of barium nitrate to an alkaline solution containing gases which evolved from the degradation of atrazine.

FIG. 7 shows the XRD of the white precipitate formed when barium nitrate is added to the alkaline solution containing gases which evolved from the degradation of atrazine. The XRD patterns reveal barium carbonate was formed, thus confirming that carbon dioxide was one of the products of photocatalytic oxidation of atrazine. Furthermore, chloride and nitrate ions were observed as final products; therefore, atrazine is completely oxidized by the 3 wt % $AgGaS_2@g-C_3N_4$ system into $CO_2$, $Cl^-$, $NO_3^-$, and $H_2O$.

Figure 8:
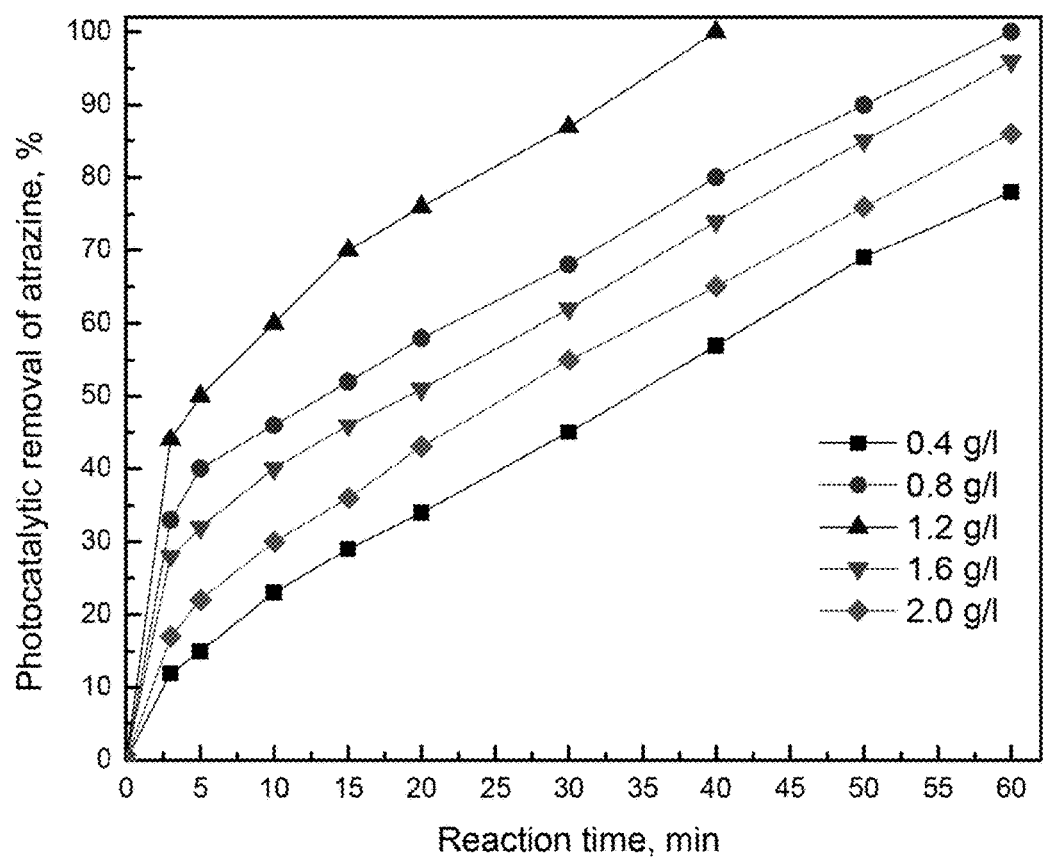
FIG. 8 is a graph showing the degradation of atrazine at various dosages of an embodiment of the composite containing 3 wt % silver gallium sulfide.

FIG. 8 shows the effect of the dose of a nanocomposite with 3 wt % $AgGaS_2$ on the degradation of atrazine. The photocatalytic activity of the nanocomposite increased from 78% to 100% by increasing the dose from 0.4 to 0.8 g/L. Increasing the dose of the photocatalyst from 0.8 to 1.2 g/L decreased the time required for the complete degradation of atrazine from 60 to 40 min. This can be attributed to the fact that a higher dose of the photocatalyst increased the number of active sites available for photocatalytic oxidation of atrazine. However, increasing the dose above 1.2 g/L yielded similar activity. A dose of the photocatalyst above a threshold may hinder the penetration of light to the surface of the photocatalyst, leading to either a decrease in photocatalytic activity or an increase in reaction time.

Figure 9:
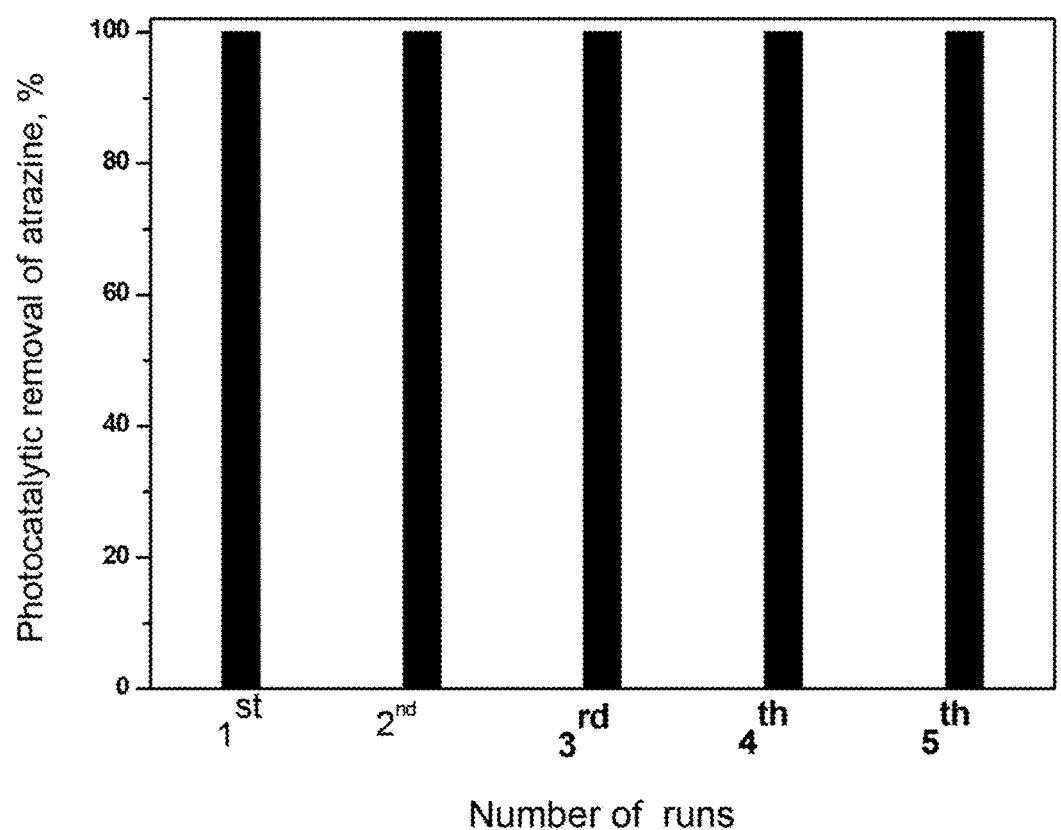
FIG. 9 is a graph showing photocatalytic removal of atrazine in the presence of an embodiment of the composite, which was recycled after each run and used in the subsequent run.

FIG. 9 shows that the nanocomposite with 3 wt % $AgGaS_2$ can be recycled and reused. The photocatalytic activity of the photocatalyst was maintained thus showing the photocatalyst was stable for 5 reaction cycles of degradation of atrazine.

In summary, the examples demonstrate that the band gap and photocatalytic activity of AgGaS$_2$@g-C$_3$N$_4$ nanocomposite can be tailored by controlling the weight percent of AgGaS$_2$. The photocatalytic activity of AgGaS$_2$@g-C$_3$N$_4$ nanocomposites for the degradation of atrazine is higher than that of the g-C$_3$N$_4$ photocatalyst. While not being bound by any theory, this observation can be attributed to the fact that the addition of AgGaS$_2$ to g-C$_3$N$_4$ decreases the electron-hole recombination rate and shifts the absorption of g-C$_3$N$_4$ to a higher wavelength. 3 wt % AgGaS$_2$@g-C$_3$N$_4$ photocatalyst has photocatalytic stability for the use for degradation of atrazine for five times and perhaps more.

The foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. A composite, comprising:
graphitic carbon nitride in the form of a sheet; and
a mixed metal sulfide comprising sulfur, a transition metal, and a post-transition metal,
wherein the mixed metal sulfide is in a form of a particle with a diameter in a range of 0.5-5 nm and disposed on the sheet of graphitic carbon nitride.

2. The composite of claim 1, which comprises 0.5-40 wt % of the mixed metal sulfide, based on a total weight of the composite.

3. The composite of claim 2, which comprises 0.5-20 wt % of the mixed metal sulfide.

4. The composite of claim 1, wherein the transition metal is silver and the post-transition metal is gallium.

5. The composite of claim 1, wherein the composite has a band gap energy in a range of more than 2 eV and less than 2.6 eV.

6. A method for producing the composite of claim 1, comprising:
dissolving a surfactant in water thereby forming a first solution;
mixing the first solution with an optionally substituted urea thereby forming a second solution;
dissolving a first metal salt, a second metal salt, and a mercaptocarboxylic acid in water thereby forming a third solution;
mixing the third solution with the second solution thereby forming a mixture; and
heating the mixture at a temperature in a range of 150-250° C. for a duration in a range of 5-20 hours thereby forming the composite.

7. The method of claim 6, wherein the surfactant is hexadecyltrimethyl ammonium bromide, the first metal salt is gallium nitrate, the second metal salt is silver nitrate, and the mercaptocarboxylic acid is mercaptoacetic acid.

8. A method for degrading a pollutant, comprising:
contacting the composite of claim 1 with a solution comprising water and 10-10,000 ppm of the pollutant thereby forming a mixture; and
irradiating the mixture with a light of a wavelength in a range of 350-740 nm thereby degrading the pollutant.

9. The method of claim 8, wherein an amount of the composite in the mixture is in a range of 0.4-2 g/L.

10. The method of claim 8, wherein at least 50% of the pollutant is degraded within 50 minutes of the irradiating.

11. The method of claim 8, wherein the pollutant is a herbicide, a pesticide, or both.

12. The method of claim 11, wherein the herbicide comprises a triazine structure.

13. The method of claim 8, further comprising:
recovering the composite after the pollutant is degraded; and
recycling the recovered composite, which maintains photocatalytic activity after being recycled for at least 4 reaction cycles.

14. The composite of claim 1, wherein the particle has a diameter in a range of 0.5-2 nm.

15. The composite of claim 1, wherein the graphitic carbon nitride has an average length in a range of 20 nm-1 mm.

16. The composite of claim 1, wherein the graphitic carbon nitride has an average thickness in a range of 0.3-100 nm.

17. The composite of claim 1, wherein the graphitic carbon nitride is nanocrystalline with a crystallite size in a range of 1-20 nm.

18. The composite of claim 1, which has a BET surface area in a range of 50-200 m$^2$/g.

19. The composite of claim 1, wherein the graphitic carbon nitride is mesoporous or microporous and has an average pore diameter in a range of 1-10 nm.

* * * * *